United States Patent
Sano

[11] Patent Number: 5,949,067
[45] Date of Patent: Sep. 7, 1999

[54] CODE PLATE OF OPTICAL ROTARY ENCODER HAVING TILTED LIGHT-DETECTION PATTERNS

[75] Inventor: Tadashi Sano, Miyagi-ken, Japan

[73] Assignee: Alps Electric Co., Ltd., Japan

[21] Appl. No.: 08/811,065

[22] Filed: Mar. 3, 1997

[30] Foreign Application Priority Data

Mar. 4, 1996 [JP] Japan .................................. 8-046284
Mar. 4, 1996 [JP] Japan .................................. 8-046286

[51] Int. Cl.$^6$ ...................................................... G01D 5/34
[52] U.S. Cl. .............................. 250/231.13; 250/231.16; 341/13
[58] Field of Search ................... 250/231.13, 231.18, 250/231.16, 231.14; 356/375; 341/13

[56] References Cited

U.S. PATENT DOCUMENTS

| | | | |
|---|---|---|---|
| 4,224,514 | 9/1980 | Weber | 250/231.13 |
| 4,827,123 | 5/1989 | Gray | 250/231.14 |
| 4,965,446 | 10/1990 | Vyse | 250/231.14 |
| 5,017,776 | 5/1991 | Loewen | 250/231.14 |

Primary Examiner—Que T. Le
Attorney, Agent, or Firm—Brinks Hofer Gilson & Lione

[57] ABSTRACT

An optical rotary encoder including a rotary substrate and an A, B phase detection pattern formed in the rotary substrate and having light-transmitting holes and light-transmitting grooves. The light-transmitting holes and grooves are apertures used to detect the angle of rotation, direction of rotation, and rotational speed of a drive shaft, and are formed with a constant width w and at a constant pitch p in the outermost periphery of the rotary substrate. The light-transmitting hole, being a slot, is formed slightly inward from the outer peripheral edge of the rotary substrate and tilted in a constant direction and at a constant angle such that an axial line in the longitudinal direction thereof is tilted with respect to a straight line connecting the center of rotation of the rotary substrate and the center between the light-transmitting holes. On the other hand, the light-transmitting groove, being a long groove, is cut out between adjacent light-transmitting holes so as to extend inward from the outer peripheral edge of the rotary substrate. A photo-interrupter is set a location offset from a vertical line. Accordingly, the optical rotary encoder is capable of detecting rotation with high resolution and accuracy, wherein the photointerrupter can be mounted with greater freedom and at a lower cost.

5 Claims, 14 Drawing Sheets

CODE PLATE OF OPTICAL ROTARY ENCODER HAVING TILTED LIGHT-DETECTION PATTERNS

BACKGROUND OF THE INVENTION

1. Field of the Invention

The present invention relates to a code plate of an optical rotary encoder.

2. Description of the Related Art

In a known conventional technique, control operations, such as controlling operations of the suspension damping force, controlling operations of the automatic transmission shift position, and steering control operations of the rear wheel of a four-wheel vehicle, are performed by detecting the steering angle, steering speed, and steering direction of a steering wheel mounted to a shaft as a result of rotation of a code plate by means of the steering shaft. In this technique, an optical rotary encoder comprising a combination of a photointerrupter and the code plate disposed around the steering shaft is used.

As shown in FIG. 11, a commonly used code plate has fine rectangular or elliptical light detection patterns (or A, B phase detection patterns) 2 and arcuate light detection patterns (or Z phase detection patterns) 3. The A, B phase detection patterns 2 are used to detect the angle of rotation, direction of rotation, and rotational speed of a rotary substrate 1, which is a non-transparent disk formed from a plastic plate, metallic plate, or the like. The light detection patterns 3 are used to detect the origin and the number of rotations of the rotary substrate 1. However, in such a conventional code plate, the axial line in the longitudinal direction of the A, B phase detection patterns and the sides of the leading edge and the trailing edge of the Z phase detection patterns 3 are both oriented radially from the rotational center 0 of the rotary substrate 1. In this document, light detection pattern is a general term used to cover light-transmitting apertures in a light transmission type rotary encoder and light reflection portions in a light reflection type rotary encoder.

As shown in FIG. 11 illustrating a portion of the code plate, a predetermined number of light-transmitting holes 2, forming the light detection patterns, are formed with the same width and at a constant pitch in the outer periphery of the non-transparent disk 1 formed from, for example, a plastic sheet or a metallic plate. Ordinarily, as shown in FIG. 15, light-transmitting holes 2, forming the light detection patterns, are formed in the non-transparent disk 1 by interposing the non-transparent disk 1 between a punch 44 and a dice 46. The punch 44 is provided with a predetermined number of light-transmitting hole opening pins 43 which can move into and out of the dice 46. The dice 64 has pin receiving holes 45 formed so as to oppose the light-transmitting hole opening pins 43. Then, the light-transmitting hole opening pins 43 move into and beyond the dice 46 to form the light-transmitting holes 2 forming the light detection patterns.

Optical rotary encoders used, for example, to detect the steering angle of a vehicle steering wheel are required to perform angle detection with high precision and resolution in order to perform control operations with high responsivity. In addition, in such optical rotary encoders, a first photointerrupter 4 for A, B phase detection and a second photointerrupter 5 for Z phase detection must often be disposed on the left and right in nonalignment relationship due to the limited space available, as shown in FIG. 12. Although in FIG. 12, the second photointerrupter 5 for A, B phase detection is set on a vertical line X—X which is perpendicular to the surface of a printed board (not shown) having the photointerrupter 5 mounted thereon and which passes through the rotational center O of the rotary substrate 1, while the first photointerrupter 4 for Z phase detection is disposed along a side of the photointerrupter 5, the photointerrupter 4 for Z phase detection can be set on the vertical line X—X passing through the rotational center O of the rotary substrate 1, while the second photointerrupter 5 for A, B phase detection can be placed along a side of the photointerrupter 4.

In the photointerrupters 4 and 5, the light-emitting device and the light-receiving device are combined in a predetermined arrangement such that light from the light-emitting device impinges upon the light-receiving device by passing through the code plate. The light-transmission type rotary encoder used has the light-emitting device 6 disposed in opposing relationship with the light-receiving device 7 on the same axis. As is clear from FIG. 13, in the case of a light transmission type rotary encoder, the light-emitting device 6 and the light-receiving device 7 are disposed on the front and back sides of the rotary substrate 1, with an optical axis Z—Z being oriented perpendicular to a line Y—Y defining the surface of the rotary substrate 1. Although not shown, in the case of a reflection type rotary encoder, the light-emitting device and the light-receiving device are set at locations where total refection occurs through the reflecting surfaces of the rotary substrate 1. The light-receiving device 7 has at least two light-receiving surfaces 7a and 7b formed in the horizontal direction, so as to be disposed toward the left and right in FIG. 12. Pulse signals (A phase signal and B phase signal) which are 90 degrees out of phase can be detected from the first light-receiving surface 7a and the second light-receiving surface 7b, respectively. In such an encoder, a light-receiving device with four light-receiving surfaces 7a, 7b, 7a', and 7b' is used to allow high-precision signal detection by the so-called differential output. The sides of each of the light-receiving surfaces 7a and 7b are formed parallel to the vertical line X—X passing through the rotational center O of the rotary substrate 1. Terminals 20 of the photointerrupter 5 are set parallel to the vertical line X—X.

Taking as an example the light-transmission type rotary encoder in which the second photointerrupter 5 for Z phase detection is set on the vertical line X—X passing through the rotational center O of the rotary substrate 1 and the first photointerrupter for A, B phase detection is disposed along a side of the photointerrupter 5, a spot S is formed by light emitted from the light-emitting device 6, passing through the A, B phase detection patterns 2, and impinging upon the set surfaces of the light-receiving device 7. The shape of the spot S changes in accordance with the angle of rotation of the rotary substrate 1, as indicated by cross-hatching in FIGS. 14A to 14D. FIG. 14A shows the shape formed when the A, B phase detection patterns 2 with a two-degree pitch exactly matches the set positions of the light-emitting device 6 and the light-receiving device 7 (defined as the initial position). FIG. 14B shows the shapes formed when the rotary substrate 1 has been rotated 0.5 degrees counterclockwise from the initial position. FIG. 14C shows the shapes formed when the rotary substrate 1 has been rotated 1.0 degree counterclockwise from the initial position. FIG. 14D shows the shapes formed when the rotary substrate 1 has been rotated 1.5 degrees counterclockwise from the initial position.

As is clear from the FIGS. 14A to 14C, in the optical rotary encoder of the present embodiment, the two light-receiving surfaces 7a and 7b are arranged in the horizontal direction, while the shape of the spot S formed by the light impinging upon the light-receiving surfaces is tilted in correspondence with tilting angle θ of the A, B phase detection patterns 2, causing the light spot 2 to cross the light-receiving surfaces 7a and 7b obliquely as the code plate rotates. Therefore, when the encoder is constructed to output the A phase and B phase signals with a phase difference of 90 degrees as the untilted light spot on the two light-receiving surfaces 7a and 7b moves, the phase difference of the A phase signal and the B phase signal is not 90 degrees, as illustrated in FIG. 14E, and, in addition, the duty ratio between the A phase and B phase is not 50%. For this reason, limitations are placed on how the A, B phase detection first photointerrupter 4 can be arranged, thus making it difficult to design the optical rotor encoder and tending to create errors in the rotational angle detection, which may seriously affect the accuracy of the various control operations. This problem becomes more noticeable, the smaller the pitch of the plurality of light detection patterns is made to increase resolution. The same problem occurs when detecting a signal by the so-called differential output where the A, B phase detection device used is one having four light-receiving surfaces 7a, 7b, 7a', and 7b', so that the light-receiving surface 7a' is connected to the light-receiving surface 7a so as to generate opposite phases and the light-receiving surface 7b' is connected to the light-receiving surface 7b so as to generate opposite phases.

Such a problem can be overcome by changing the forms and arrangement of the light-receiving surfaces 7a and 7b and using the light-receiving device 7 which outputs an A phase signal and a B phase signal which are out of phase by 90 degrees with respect to the tilted light spot S. However, this is far from being a practical solution, since developing and producing a special-purpose light-receiving device 7 in accordance with the type of encoder results in expensive rotary encoders.

In the second photointerrupter 5 for Z phase detection set on the vertical line X—X passing through the rotational center O of the rotary substrate 1, the above-described problem does not arise even when the sides of the leading edge and the trailing edge of the Z phase detection patterns 3 are formed radially from the rotational center O of the rotary substrate 1, since the light spot crosses the light-receiving surfaces of the light-receiving device, while being kept perpendicular thereto.

SUMMARY OF THE INVENTION

Accordingly, an object of the present invention is to provide an optical rotary encoder which detects rotation with high resolution and precision, wherein the photointerrupters can be mounted with more freedom and inexpensively.

In recent years, the light transmission type rotary encoder used, for example, to detect the steering angle of a vehicle steering wheel is required provide high resolution detection in order to perform various control operations with high responsivity. For this reason, it is necessary to form more light-transmitting holes 2 with a smaller pitch and more accurately in the code plate of such a light transmission type rotary encoder.

Since the width between adjacent light-transmitting holes becomes narrower, as the number of light-transmitting holes 2 increases and the pitch between the light-transmitting holes 2 becomes smaller, during formation of the light-transmitting holes 2 it becomes difficult to properly press a portion of the non-transparent disk 1 between the punch 4 and the dice 6 with the required force. This prevents very accurate formation of the light-transmitting holes 2, and tends to cause deformation of the light-transmitting holes 2 and the portion therearound. When such problems occur, the output signals of the photointerrupters generated are pulse signals which are not in phase, which may seriously affect the responsivity of the various control operations. In addition, when a larger number of light-transmitting holes 2 need to be formed, a larger number of expensive light-transmitting hole opening pins 3 are required, the die structure becomes complicated, and maintenance costs for repairing broken pins 3 are increased. This results in higher die production costs and thus high rotary encoder production costs.

Accordingly, another object of the present invention is to provide a method for producing a code plate for a light-transmission type rotary encoder, which allows light-transmitting apertures to be formed very accurately and at a lost cost.

To this end, according to the present invention, there is provided a code plate having a plurality of rectangular or elliptical A, B phase detection patterns formed in the circumferential direction of the rotary substrate, such that the axial line in the longitudinal direction of the A, B phase detection patterns tilt in a constant direction and at a constant angle with respect to a straight line connecting the rotational center of the rotary substrate and the center of the A, B phase detection patterns. For the Z phase detection patterns formed by arcuate shapes formed in the circumferential direction of the rotary substrate around a center defined by the rotational center of the rotary substrate, the sides of the leading edge and the trailing edge of the Z phase detection patterns are formed so as to tilt in a constant direction and at a constant angle with respect to a straight line connecting the rotational center of the rotary substrate and the center between the edge sides.

When the lines extending in the longitudinal direction or the edge sides of the light detection patterns are tilted in a constant direction and at a constant angle so as to be formed radially from the rotational center of the rotary substrate, the lines extending in the longitudinal direction or the edge sides are formed vertically in an offset fashion at the left or right sides of the vertical line perpendicular to a printed board having photointerrupters mounted thereto and passing through the rotational center of the rotary substrate. Therefore, when the light-emitting device and the light-receiving device forming the photointerrupter are set at these locations, the shape of the light spot crossing the light-receiving surfaces is vertically formed. Accordingly, when the light detection pattern is an A, B phase detection pattern, a general-purpose light-receiving device can be used to generate an A phase signal and a B phase signal which are 90 degrees out of phase. This allows accurate detection of the rotational angle or the like. When the light detection pattern is a Z phase detection pattern, accurate detections of, for example, the origin of the rotary substrate can be performed. In addition, when the Z phase output is converted into a two-phase output, no problems arise. Consequently, even when the A, B phase detection patterns are formed with a small width, accurate detection of, for example, the rotational angle can be performed, thereby increasing the resolution of the optical rotary encoder.

As long as the light-emitting device and the light-receiving device are set near the locations where the edge sides or the lines extending in the longitudinal direction of the light detection patterns are formed vertically, more accurate rotary encoder rotation detection can be made as compared to the case where the edge sides or the lines extending in the longitudinal direction of the light detection patterns are radially formed, even when the light-emitting device and the light-receiving device are not exactly set at these locations. Therefore, less limitations are placed on the arrangement of the photointerrupters.

On the other hand, when the locations for setting the photointerrupters are predetermined, the tilting angle of the light detection patterns is set at or nearly at the angle formed between a vertical line, which is perpendicular to the printed board having the photointerrupters mounted thereto and which passes through the rotational center of the rotary substrate and a straight line connecting an intersection point of the line with the rotational center of the rotary substrate and an intersection point of the line with the optical axis which extends above the rotary substrate.

In a code plate in which the A, B phase detection patterns and the Z phase detection patterns are formed at different radii on one rotary substrate, it is preferable to tilt the edge sides of the light detection patterns formed closer to the outer periphery of the rotary substrate. Tilting the edge sides can reduce the size of the photointerrupters and thus reduce the actual occupied area thereof, so that less limitations are placed on the arrangement positions of the photointerrupters. It is to be noted that the signal detection accuracy can similarly be increased, when either type of light-detection patterns is provided.

To achieve the above-described objects, according to the present invention, in the code plate of the light transmission type rotary encoder which has light-transmitting apertures having the same width and formed at a constant pitch at the same radius from the rotational center of a non-transparent disk, the light-transmitting apertures are in the form of a plurality of light-transmitting grooves cut out so as to be recessed inward from the outer peripheral edge of the non-transparent disk and one or more light-transmitting holes formed between adjacent grooves.

When the light-transmitting apertures to be formed in the code plate are in the form of a plurality of light-transmitting grooves cut out so as to be recessed inward from the outer peripheral edge of the non-transparent disk and one or more light-transmitting holes formed between adjacent light-transmitting grooves, a method is used to form either the light-transmitting holes or the light-transmitting grooves first, followed by formation of either the light-transmitting holes or the light-transmitting grooves which have not been formed yet. Such a method allows a larger area of the non-transparent disk to be held by the punch and the dice during formation of the light-transmitting holes and the light-transmitting grooves, so that the non-transparent disk is held more securely, making it possible to achieve more accurate formation of the light-transmitting holes and the light-transmitting grooves. Using the production method in which the light-transmitting holes first, followed by formation of the light-transmitting grooves, results in less frequent deformation of the light-transparent disk, when the light-transmitting holes are being punched out, since the light-transmitting holes are punched out at a large pitch, whereby the light-transmitting holes can be formed more accurately. When the light-transmitting grooves are being cut out, the light-transmitting grooves can be cut out with a much smaller force than is required for punching the light-transmitting holes, thus permitting the light-transmitting grooves to be formed within a narrow space with more accuracy, after the light-transmitting holes have been punched out.

When the light-transmitting apertures to be formed in the code plate are in the form of light-transmitting grooves and light-transmitting holes, the number of expensive light-transmitting hole opening pins are reduce in correspondence with the number of light-transmitting grooves, and the die construction can be simplified, resulting in large reductions in die production costs, and reduced maintenance costs for repairing broken light-transmitting hole opening pins. Therefore, it is possible to considerably reduce the overall production costs of the rotary encoder.

DESCRIPTION OF THE PREFERRED EMBODIMENTS

Embodiment 1

Figure 1:
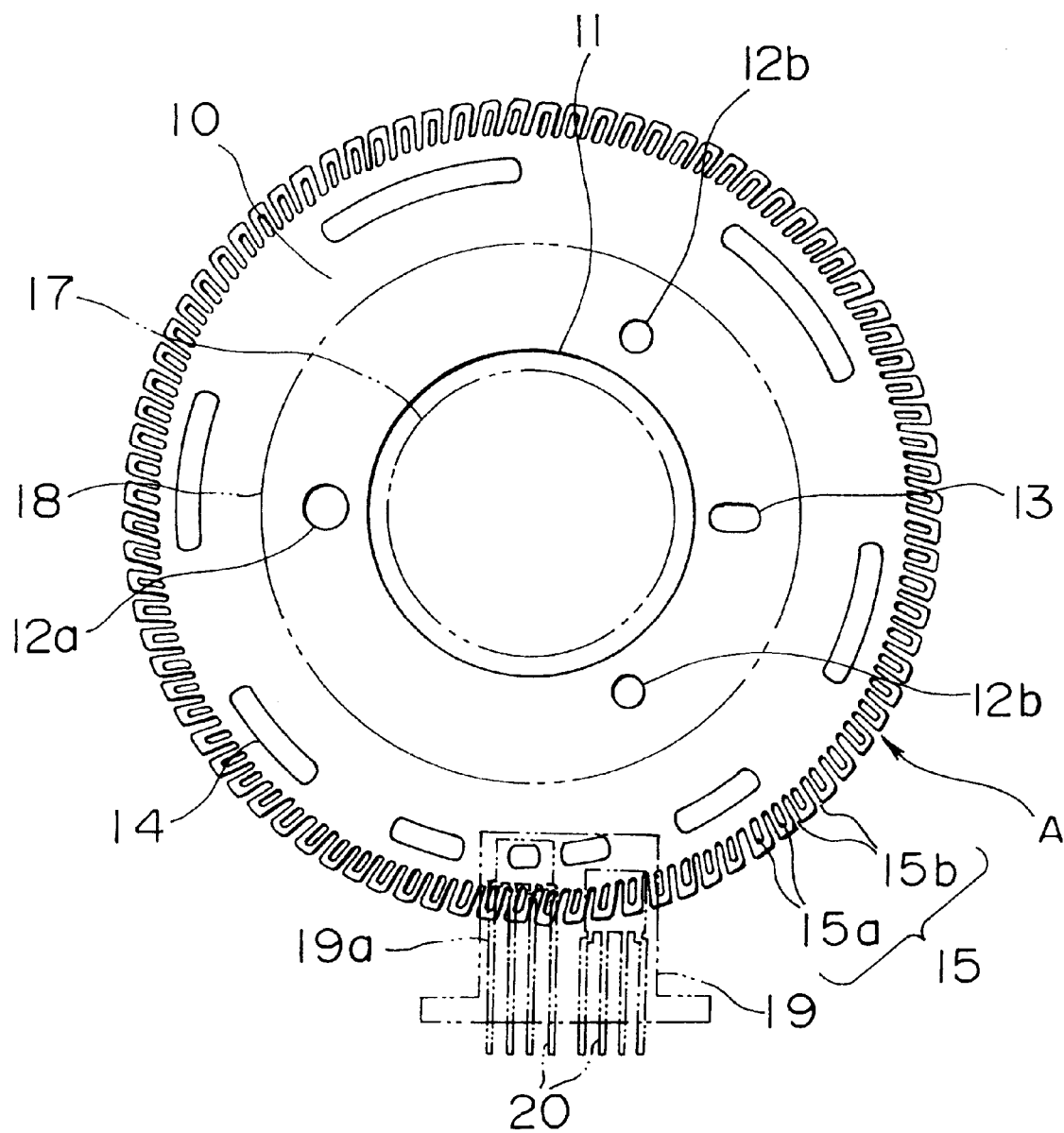
FIG. 1 is a front view of a code plate of Embodiment 1 in accordance with the present invention.
Figure 2:
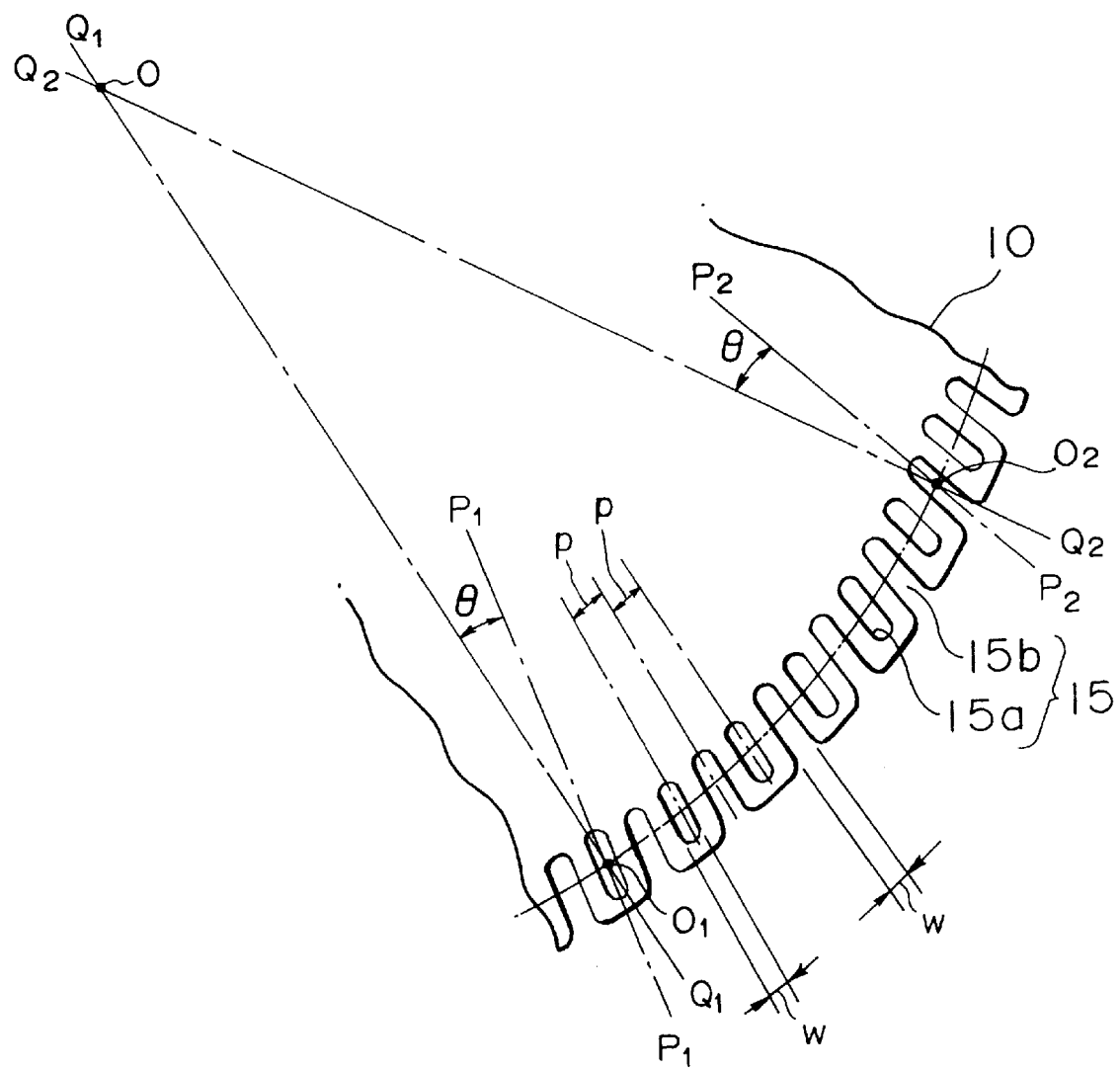
FIG. 2 is a view showing in detail portion A of FIG. 1.
Figure 3:
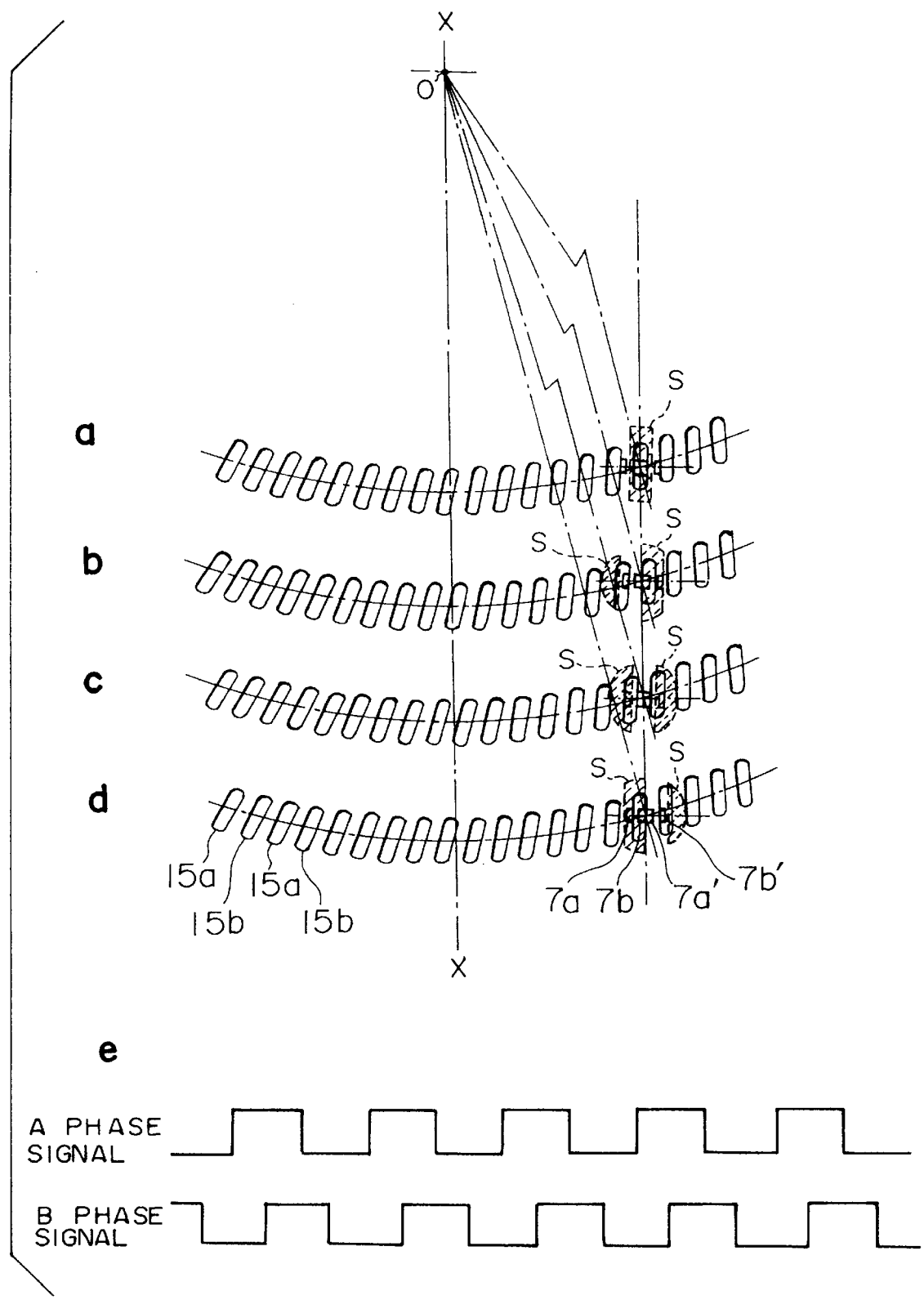
FIG. 3 illustrates the effects produced by the code plate of Embodiment 1 in accordance with the present invention.
Figure 4A:
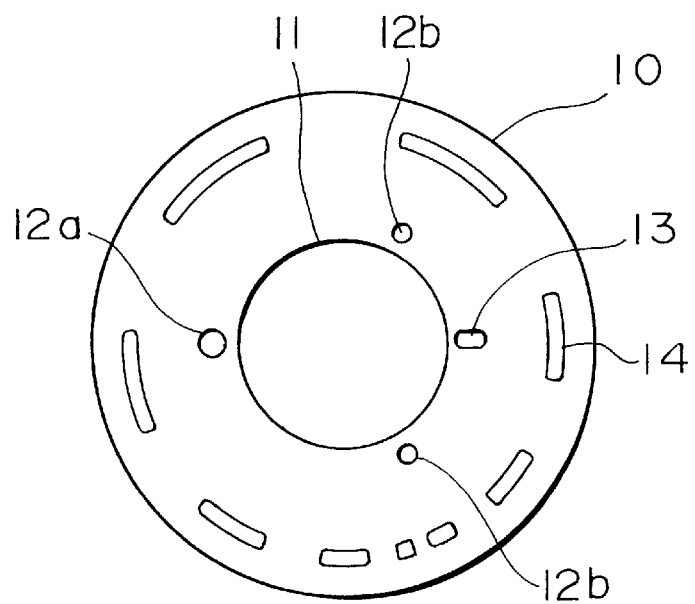
FIGS. 4A to 4C are views illustrating the method of producing the code plate of Embodiment 1 in accordance with the present invention.
Figure 4B:
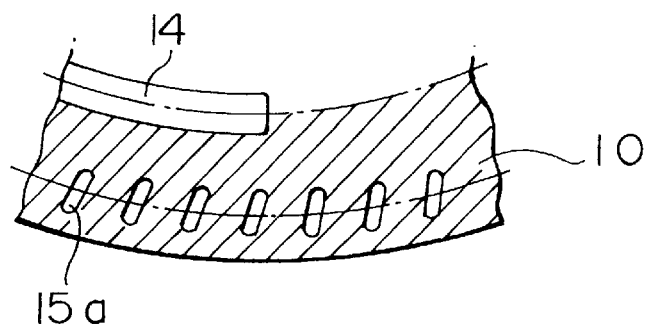
Figure 4C:
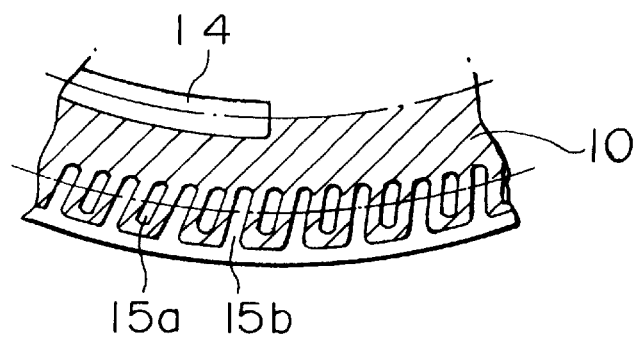

A description will now be given of a code plate of an optical rotary encoder of Embodiment 1 in accordance with the present invention, with reference to FIGS. 1 to 4. FIG. 1 is a front view of the code plate of the present embodiment. FIG. 2 is a view showing in detail portion A of FIG. 1. FIGS. 3A to 3E are views illustrating the effects produced by the optical rotary encoder of the present embodiment. FIGS. 4A to 4C are main plan views illustrating the production method of the code plate of the present embodiment and the effects produced by the production method. The code plate is applied to a light-transmission type rotary encoder and comprises A, B phase detection patterns formed at the outermost periphery of a rotary substrate, and Z phase detection patterns formed at the inner periphery with respect to where the A, B phase detection patterns are formed.

As shown in FIG. 1, the code plate of the present embodiment comprises a rotary substrate 10 composed of, for example, a non-transparent plastic plate or metallic plate. The rotary substrate 10 has a center hole 11, a mounting-and-positioning hole 12a, mounting holes 12b, a positioning hole 13, Z phase detection patterns 14, and A, B phase detection pattern 15a. The A, B detection patterns 15 are formed by light-transmitting holes 15a and light-transmitting grooves 15b.

The center hole 11 is a hole for receiving a drive shaft 17 (such as a steering shaft) mounted to the rotary substrate 10, and is formed in the center of the rotary substrate 10. The mounting holes 12b and the positioning hole 13 are used for mounting the rotary substrate 10 to a rotor 18 mounted to the drive shaft in a predetermined positional relationship, and are formed around the center hole 11. The rotary 18 has protrusions (not shown) protruding therefrom and formed in correspondence with the shapes of the mounting-and-positioning hole 12a and the positioning hole 13. These protrusions are fitted into the mounting-and-positioning hole 12a and the positioning hole 13 to accurately mount the rotary substrate 10 to the rotor 18. Although, the rotary substrate 10 can be secured directly to the rotor 18 with screws which are passed through the mounting-and-positioning hole 12a and the mounting holes 12b, in order to prevent deformation of the rotary substrate 10, it is preferable to interpose the rotary substrate 10 between the rotor and a clamper (not shown) and screw them together. The Z phase signal detection hole 14 is used to detect the reference position of the drive shaft 17 and forms an arc shape at a constant radius (or at radius $R_1$ in the present embodiment) from the rotational center O of the rotary substrate 10. The edge sides of the Z phase signal detection hole 14 are formed radially from the rotational center O of the rotary substrate 10.

The light-transmitting holes 15a and the light-transmitting grooves 15b are apertures used for detecting, for example, the angle of rotation, direction of rotation, or rotational speed of the drive shaft 17, and, as shown in detail in FIG. 2, are formed along the outermost periphery of the rotary substrate 10 with the same width w and at a constant pitch p. The light-transmitting holes 15a are slots formed slightly inward from the outer periphery of the rotary substrate 10 such that an axial line $P_1$—$P_1$ extending in the longitudinal direction thereof tilts with respect to a straight line $Q_1$—$Q_1$ connecting the rotational center of the rotary substrate 10 and the center $o_1$ of the light-transmitting hole 15a in a constant direction and at a constant angle θ. On the other hand, the light-transmitting grooves 15b are cut out as long grooves extending inwardly from the outer peripheral edge of the rotary substrate 10 and formed between adjacent light-transmitting holes 15a. The light-transmitting grooves 15b are also formed such that an axial line $P_2$—$P_2$ extending in the longitudinal direction thereof tilts with respect to a straight line $Q_2$—$Q_2$ connecting the rotational center O of the rotary substrate 10 and center $O_2$ of the light-transmitting groove 15b in the same constant direction and at a constant angle θ.

Figure 13:
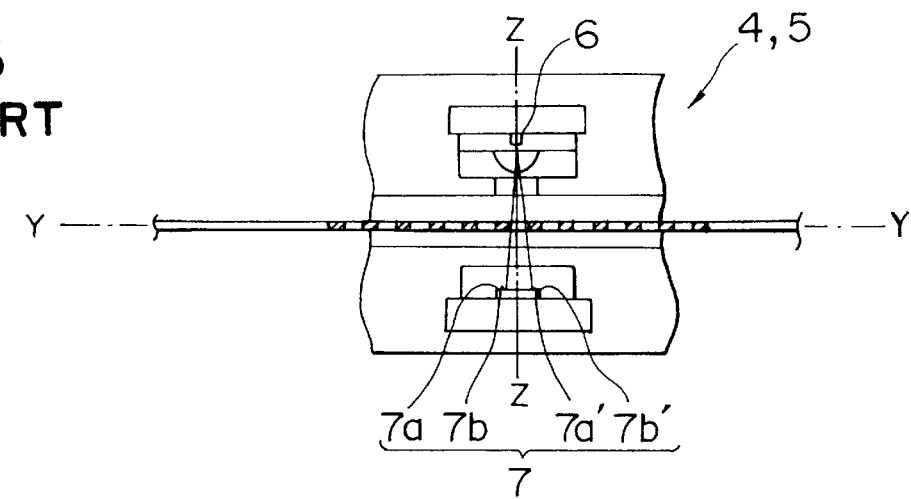
FIG. 13 is a main sectional view of the construction of and arrangement of the component parts of the photointerrupter.
Figure 14:
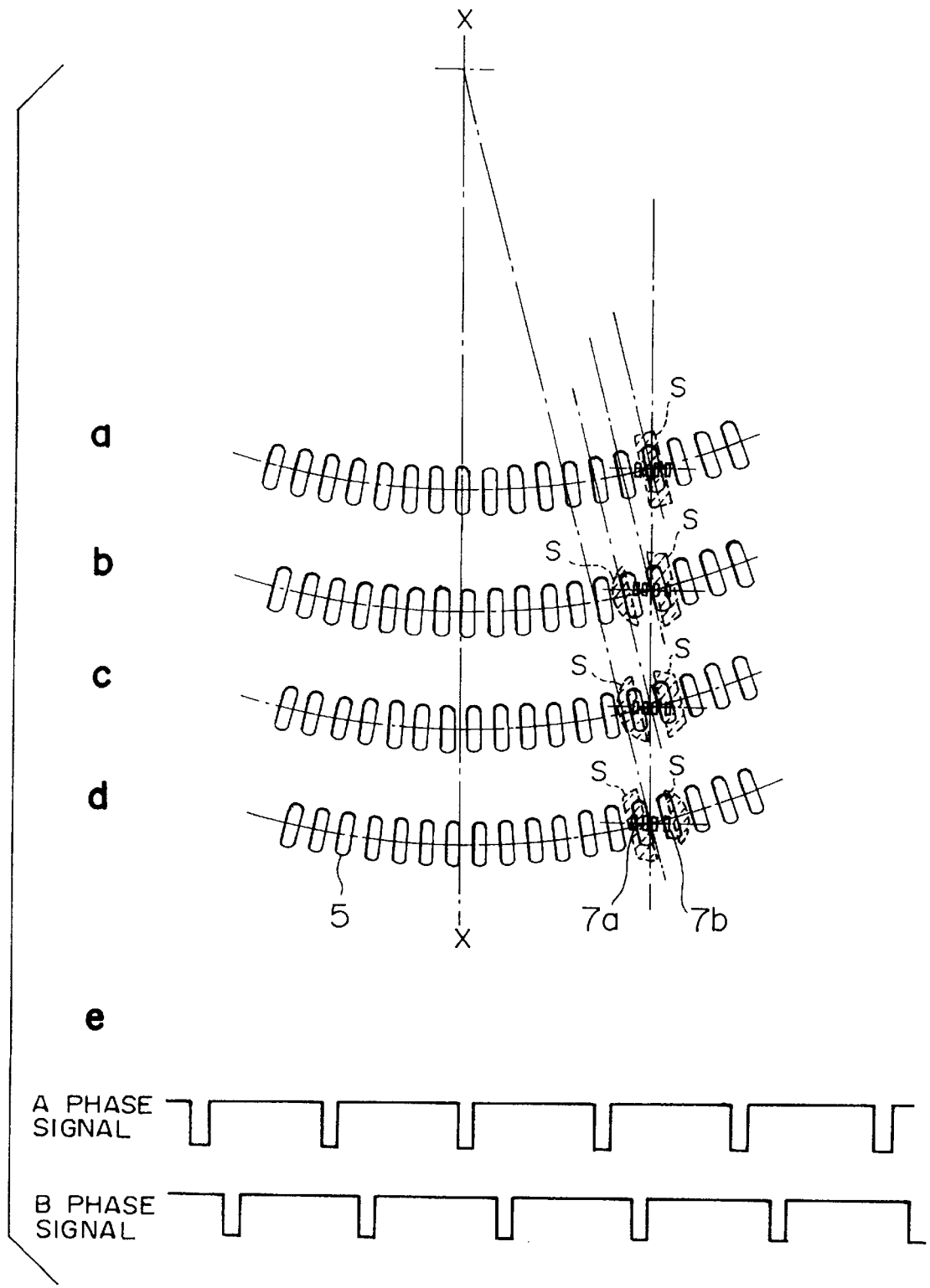
FIG. 14 illustrates the disadvantages of the conventional code plate.
Figure 15:
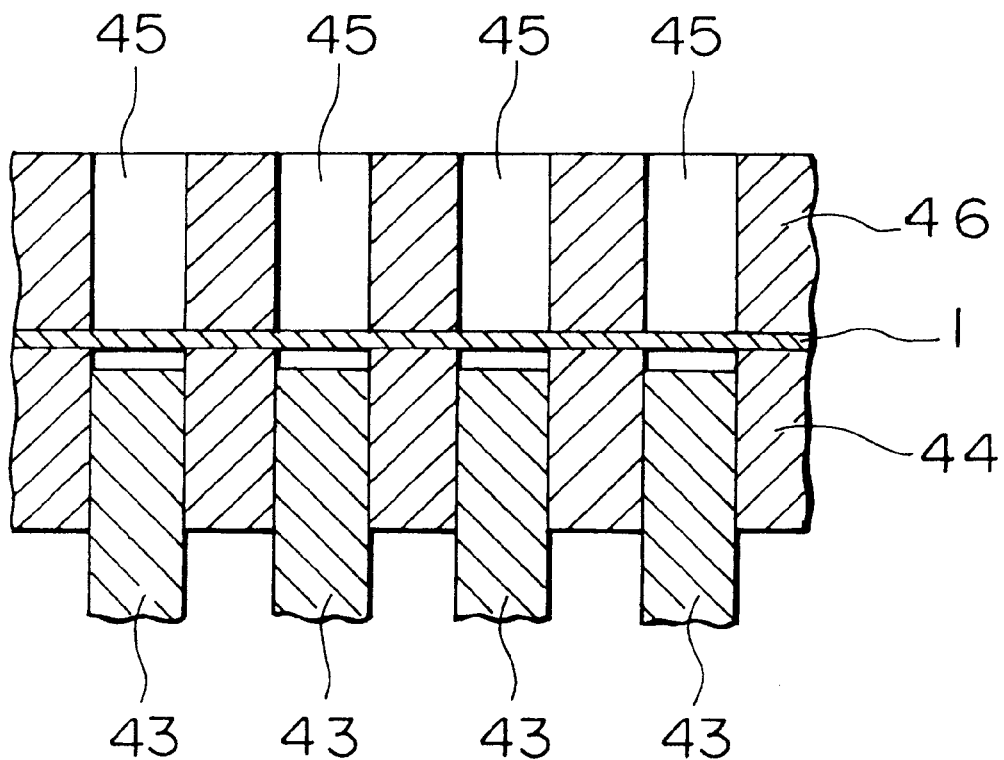
FIG. 15 is a main sectional view illustrating the method of producing t conventional code plate.

The inside edges of each of the light-transmitting holes 15a and light-transmitting grooves 15b are formed at a constant radius (radius $R_2$) from the rotational center O of the code plate, and a photointerrupter 19 is set at the center (at radius $R_3$ from the rotational center O of the code plate) of the A, B phase detection patterns 15, thereby permitting a signal from the light-transmitting hole 15a and a signal from the light-transmitting groove 15b to be detected at the same level. As shown in FIG. 1, the photointerrupter 19 is placed in a direction horizontal to a line X—X which is vertical to a printed substrate surface having mounted thereon the photointerrupters 19 and photointerrupter 19a, such that the A, B phase detection patterns 15 are formed substantially vertical to the printed substrate surface. Obviously, as shown in FIG. 13, a light-emitting device 6 and a light-receiving device 7, both of which make up the photointerrupter 19, can be set on the front and back sides of the rotary substrate, with the optical axis Z—Z oriented vertical to the rotary substrate surface Y—Y. The Z phase detection photointerrupter 19a is located on the vertical straight line X—X passing through the rotational center O of the rotary substrate 10 and at radius $R_1$ from the rotational center O of the rotary substrate 10.

In an optical transmission rotary encoder, when the light-transmitting hole 15a and the light-transmitting groove 15b are tilted the ratio between transmission and interruption is not 50:50. In an optical reflection type rotary encoder, the ratio between reflection and diffusion is not 50:50, so that the detection signal duty ratio is not 50%. When the tilting angles θ of the light-transmitting hole 15a and the light-transmitting groove 15b are too large, so that deviations in the detection signal duty ratio becomes a practical problem, the detection signal duty ratio can be made an optimum value by changing the widths of the light-transmitting hole 15a and the light-transmitting groove 15b.

A description will now be given of the effects produced by the optical rotary encoder provided with the code plate having the above-described construction, with reference to FIGS. 3A to 3E.

A spot S, formed by light emitted from the light-emitting device 6, passing through the A, B phase detection patterns 15, and impinging upon the set surface of the light-receiving device 7, changes its form in accordance with the angle of rotation of the rotary substrate 10, as shown by cross-hatching in FIGS. 3A to 3D. FIG. 3A shows the spot formed at the initial position when the A, B phase detection patterns 15 exactly coincide with the setting positions of the light-emitting device 6 and the light-receiving device 7. FIG. 3B shows the spots formed when the rotary substrate 10 is rotated 0.5 degrees counterclockwise from the initial position. FIG. 3C shows the spots formed when the rotary substrate 10 is rotated 1.0 degrees counterclockwise from the initial position. FIG. 3D shows the spots formed when the rotary substrate 10 is rotated 1.5 degrees counterclockwise from the initial position.

As is clear from FIGS. 3A to 3D, in the optical rotary encoder of the present embodiment, the photointerrupter 19 is set such that the A, B phase detection patterns 15 extend substantially vertically, so that the shapes of the spots S formed by the light impinging upon surfaces 7a and 7b of the light-receiving device 7 extend vertically in accordance with the direction of the A, B phase detection patterns 15. Therefore, as the code plate rotates, the light spot S crosses the light-receiving surfaces 7a and 7b horizontally, so that, as shown in FIG. 3E, A phase and B phase signals which are 90 degrees out of phase can be obtained by the general-purpose light-receiving device 7 having the light-receiving surfaces 7a and 7b which generate A phase and B phase signals having a phase difference of 90 degrees in accordance with the movement of the vertical light spot.

Consequently, the rotary encoder permits more reliable control operations with increased responsivity, and the A, B phase detection photointerrupter 19 can be placed horizontally with respect to the Z phase detection photointerrupter 19a, thereby simplifying the design of the optical rotary encoder. In addition, since the A, B phase detection patterns 15 formed at the outermost periphery of the rotary substrate 10 is tilted, the height of the photointerrupter can be made smaller, compared to the case where an edge side of the Z phase detection patterns 14 formed at the inner periphery of the rotary substrate 10 is tilted and the photointerrupter 19a is disposed horizontally with respect to the vertical line X—X passing through the rotational center O of the rotary substrate 10. As a result, the area required for mounting the photointerrupter is reduced, thereby simplifying the design of the optical rotary encoder. Further, the optical rotary encoder becomes inexpensive to produce, since no special light-receiving device is required.

Since the Z phase detection photointerrupter 19a is set on the vertical line X—X passing through the rotational center O of the rotary substrate 10, no inconvenience arises from forming an edge side of the Z phase signal detection hole 14 radially from the rotational center O of the rotary substrate 10, which permits accurate detection of the origin of the drive shaft.

A description will now be given of the method of producing the code plate of the present embodiment.

A non-transparent plastic plate, metal plate, or the like is punched out to form the rotary substrate 10 with the center hole 11, the mounting holes 12, the positioning hole 13, and the Z phase signal detection hole 14, as shown in FIG. 4A.

The rotary substrate 10 is interposed between a punch and a dice, with the punch provided with a predetermined number of light-transmitting hole opening pins and a light-transmitting groove forming cutter. The light-transmitting hole opening pins are passed through and beyond the dice to thereby form the light-transmitting holes 15a. In this case, the portion where the light-transmitting grooves are to be formed and the portion therearound are held by the punch and the dice, so that during formation of the light-transmitting holes 15a, the rotary substrate 10 is more securely held, thereby allowing precise opening of the light-transmitting holes 15a. These two portions are indicated by slanted lines in FIG. 4B.

The light-transmitting groove forming cutter is then driven to form the light-transmitting grooves 15b in the outer periphery of the rotary substrate 10 with the light-transmitting holes 15a. In this case, the portion around the light-transmitting holes 15a (indicated by slanted lines in FIG. 4C) can also be held between the punch and the dice, so that in this case too during formation of the light-transmitting grooves 15b, the rotary substrate 10 can be securely held. In addition, since the force required to cut out the light-transmitting grooves is considerably smaller than the force required to punch out the light-transmitting holes, the light-transmitting grooves 15b can be very accurately cut out in a narrow space after the light-transmitting holes have been punched out.

According to the method of producing a code plate of the present embodiment, the light-transmitting holes 15a and the light-transmitting grooves 15b can be accurately formed, since the rotary substrate 10 can be securely held between the dice and the punch. In addition, die production costs and thus production costs of the rotary encoder can be reduced, since the number of expensive light-transmitting hole opening pins can be reduced in correspondence with the number of light-transmitting grooves 15b.

Embodiment 2

Figure 5:
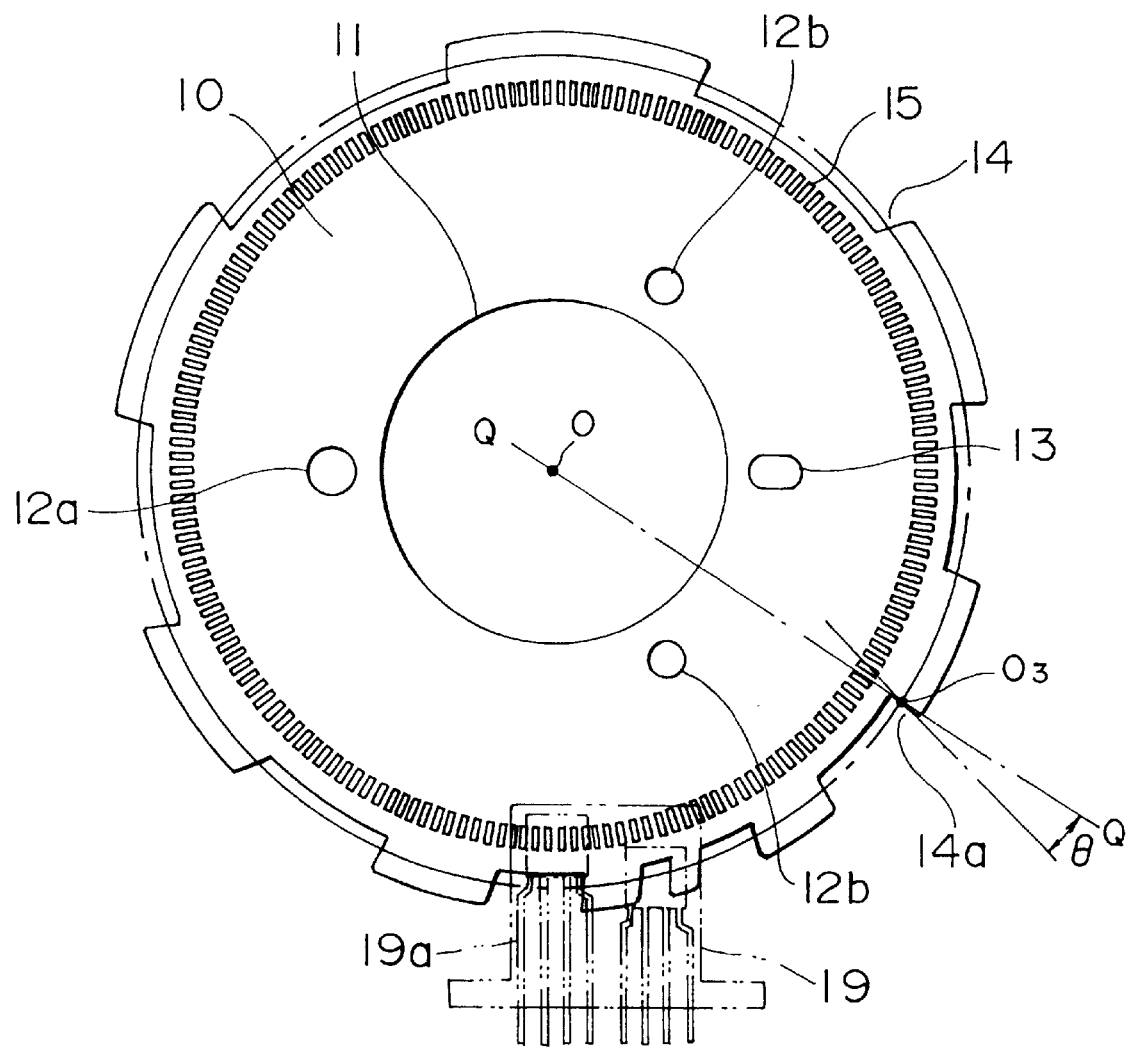
FIG. 5 is a front view of a code plate of Embodiment 2 in accordance with the present invention.

A description will now ben given of an optical rotary encoder code plate of Embodiment 2 in accordance with the present invention, with reference to FIG. 5 which is a front view of the code plate in the present embodiment. As is clear from FIG. 5, the code plate has a Z phase detection patterns 14 cut out into the shape of a circular arc at the outermost periphery of the rotary substrate 10, and an A, B phase detection patterns 15 formed in the inner peripheral region thereof.

An edge side 14a of the Z phase signal detection hole 14 is linearly formed so as to be tilted in a constant direction and at a constant angle θ with respect to a straight line Q—Q connecting the rotational center O of the rotary substrate 10 and center $o_3$ of the edge side 14a. On the other hand, the A, B phase detection patterns 15 are formed by rectangular or elliptical light-transmitting holes with the same constant width w and arranged at a constant pitch p on a circumference concentric to the rotational center O of the rotary substrate 10. The light-transmitting holes forming the A, B phase detection patterns 15 are radially arranged from the rotational center O of the rotary substrate 10.

The A, B phase detection photointerrupter 19 is set on the vertical line X—X passing through the rotational center O of the rotary substrate 10 and at a radius $R_1$ from the rotational center O of the rotary substrate 10. On the other hand, the Z phase detection photointerrupter 19a is set so as to extend on in the horizontal direction with respect to the vertical line X—X, and at a position the edge side 14a of the Z phase signal detection hole 14 extends substantially vertically. The other portions of the code plate are constructed in essentially the same way as those of the code plate of Embodiment 1, so that they will not be hereunder described to avoid repetition.

In the optical rotary encoder of the present embodiment, the photointerrupter 19a is set such that the edge side 14a of the Z phase signal detection hole 14 is positioned substantially vertically, so that the shape of the light spot S formed on the light-receiving surface of a light-receiving device 7 is formed vertically, in accordance with the direction of the edge side 14a. Therefore, the origin of the drive shaft 17 and the edge side of the Z phase signal detection hole 14 and the leading edge or trailing edge of the pulse signal output from the light-receiving device 7 can accurately be made to match, as a result of which more accurate detections of the origin of the drive shaft 17 can be made. This allows more precise and reliable control of the rotation of the drive shaft 17 to be achieved. Obviously, similar effects can be obtained when the Z phase signal detection photointerrupter 19a used is one having two or more light-receiving surfaces to allow it to detect Z two phase signals. In addition, the photointerrupters 19 and 19a can be easily disposed, as has been the case with the optical rotary encoder of Embodiment 1.

Although in the foregoing description, the code plate has been described as being applied to a light-transmission type rotary encoder, it may also be applied to a reflection type rotary encoder. In such a case, reflecting surfaces are used for the Z phase detection patterns 14 and the A, B phase detection patterns 15.

In addition, although in the foregoing description, the code plate provided with both the Z phase detection patterns 14 and the A, B phase detection patterns 15 was taken as an example, a code plate with either one of the patterns can also be used. For layout reasons, even in the rotary encoder with the above-described code plate, it may not be possible to disposed the photointerrupter on the vertical line passing through the rotational center of the rotary substrate. Therefore, the orientation of the edge sides of the Z phase detection patterns 14 or the axial line in the longitudinal direction of the A, B phase detection pattern 15 are tilted in the same constant direction and at a constant angle in order to shift the setting position of the photointerrupter toward the left or right of the vertical line, resulting in less restrictions being placed on the design and increased precision in the signal detection and thus in the various rotation control operations.

Although in Embodiment 1, the A, B phase detection patterns 15 were described as having light-transmitting holes 15a and light-transmitting grooves 15b, the patterns 15 may be provided with either the light-transmitting holes 15a or the light-transmitting grooves 15b alone. Similarly, although in Embodiment 2, the Z phase detection patterns 14 were described as being formed by cutouts, the patterns 14 may be formed by arcuate through holes or reflecting surfaces.

In addition, although in Embodiment 1, one light-transmitting hole 15a was formed for every light-transmitting groove 15b formed, the gist of the present invention is not limited thereto, so that a plurality of light-transmitting holes 15a may be formed for every light-transmitting groove 15b.

In each of the foregoing embodiments, although the rotary substrate 10 was provided with a center hole 11, mounting holes 12, a positioning hole 13, Z phase detection patterns 14, and A, B phase detection patterns 15, the rotary substrate 10 may be provided with other through holes or patterns, when necessary, or may not be provided with other through holes or patterns, when they are not necessary.

Figure 6:
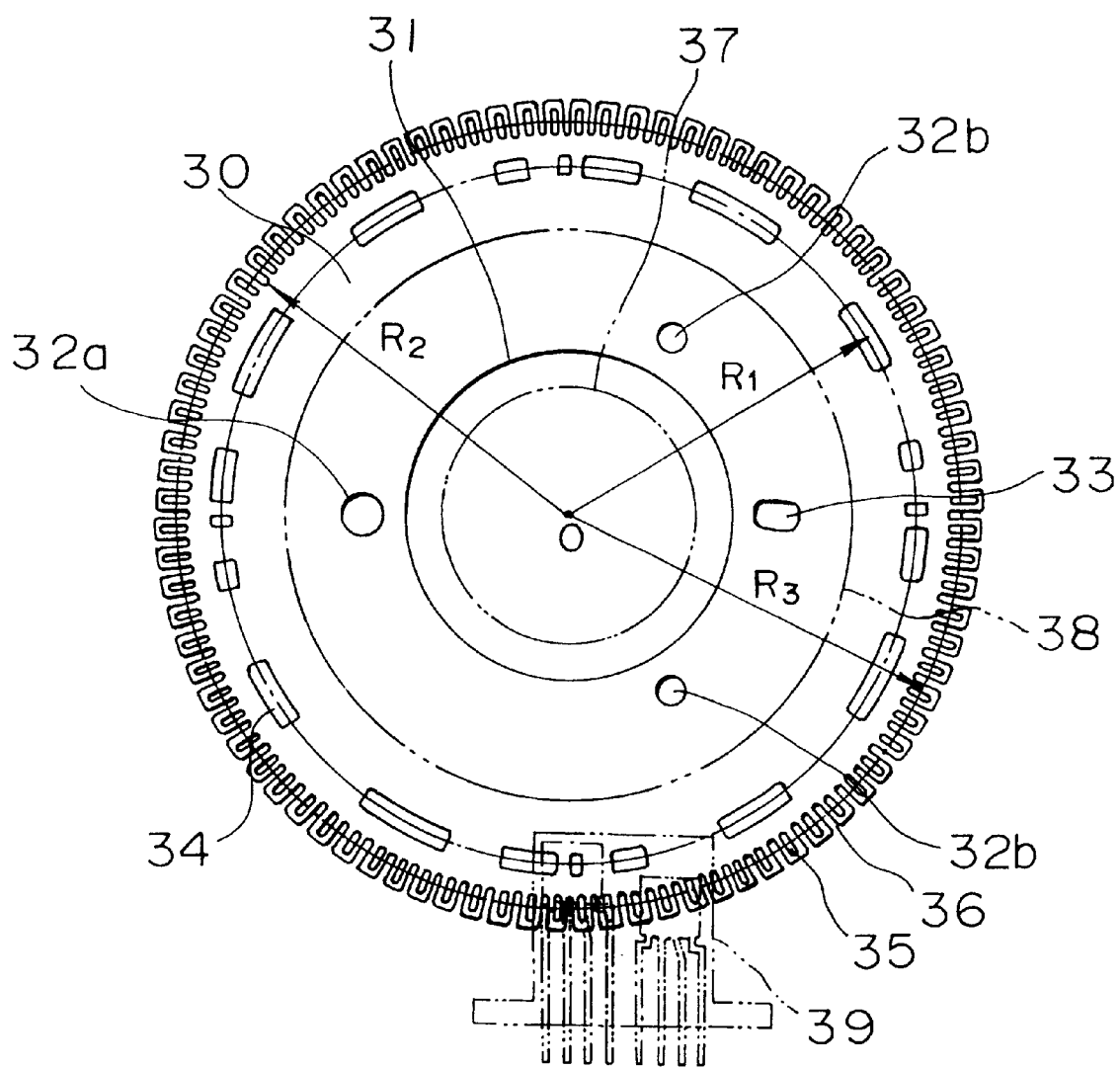
FIG. 6 is a plan view of a code plate of Embodiment 3 in accordance with the present invention.
Figure 7:
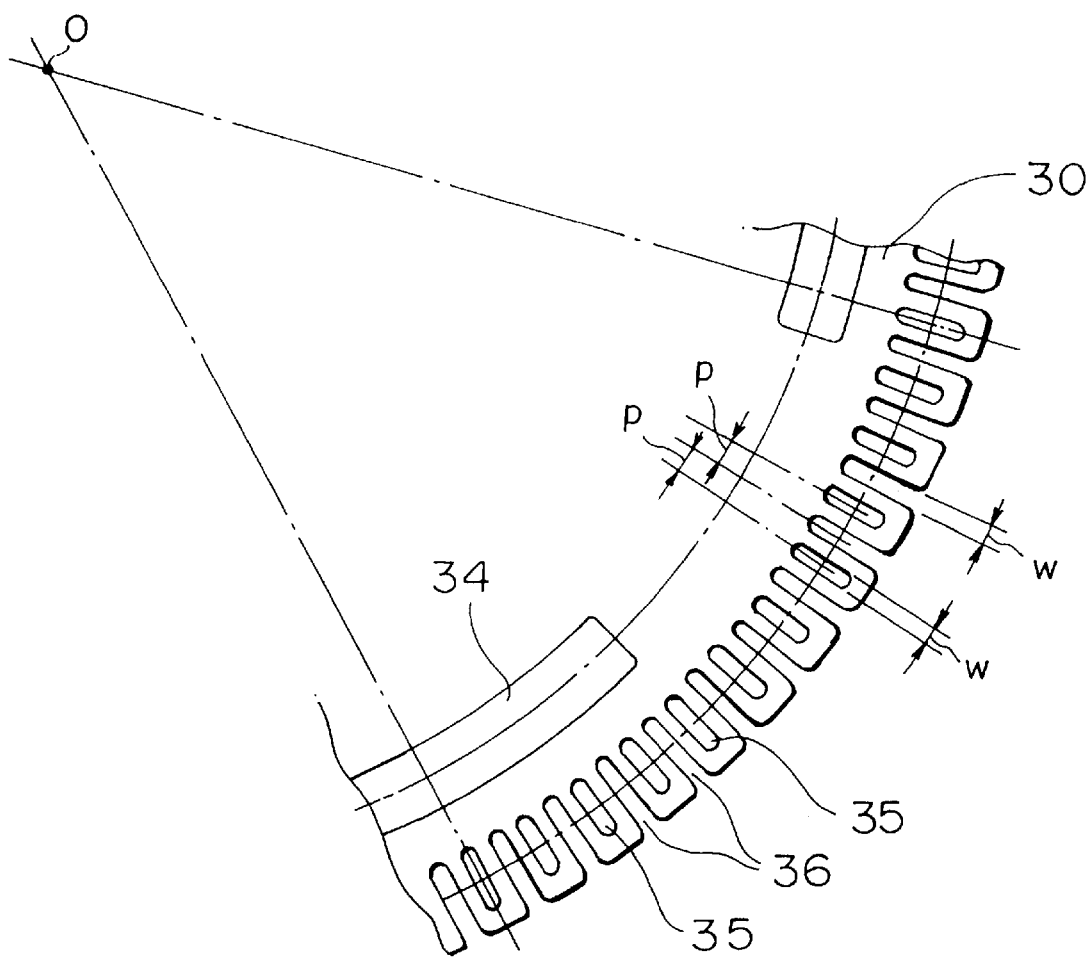
FIG. 7 is a view showing in detail portion B of FIG. 6.
Figure 8A:
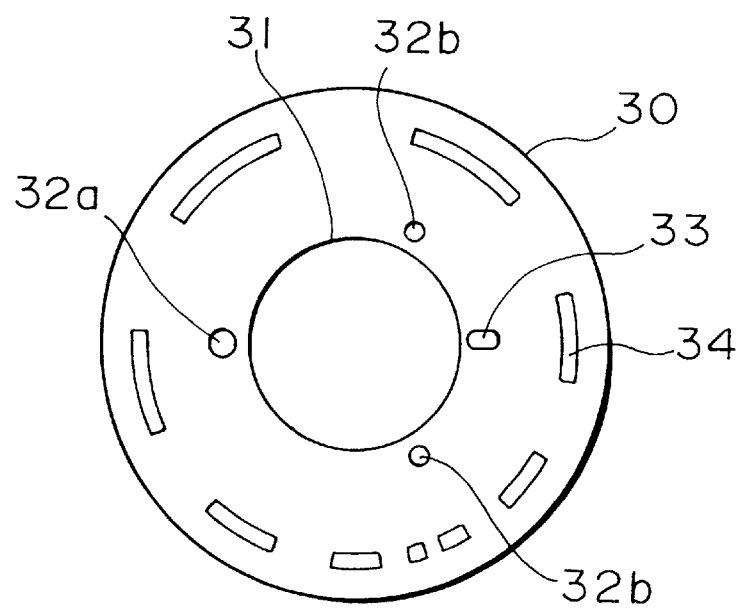
FIG. 8A to 8C are views illustrating the manufacturing processes of the code plate of Embodiment 3 in accordance with the present invention.
Figure 8B:
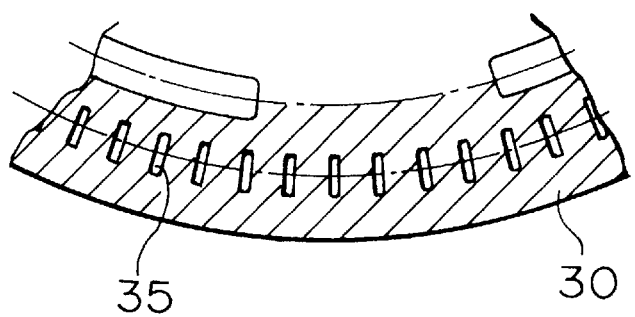
Figure 8C:
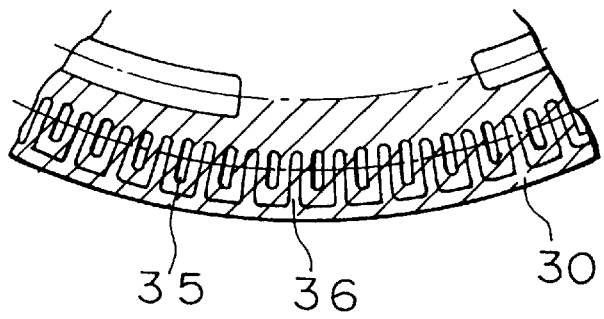

A description will now be given of another embodiment of a code plate of a light transmission type rotary encoder in accordance with the present invention, with reference to FIGS. 6 to 8. FIG. 6 is a plan view of an embodiment of a code plate. FIG. 7 is a view showing in detail portion B of FIG. 6. FIGS. 8a to 8C are plan views illustrating the method of producing the code plate of the embodiment and effects obtained from the production method.

Embodiment 3

As shown in FIG. 6, the code plate of the present embodiment comprises a non-transparent disk 30, composed of a non-transparent plastic plate, metallic plate, or the like, which contains a center hole 31, a mounting-and-positioning hole 32a, mounting holes 32b, a positioning hole 33, a Z phase signal detection hole 34, light-transmitting holes 35, and light-transmitting grooves 36. The center hole is a hole for passing through a drive shaft 37 (such as a steering shaft) of the non-transparent disk 30, and is formed in the center of the non-transparent plate 30. The mounting-and-positioning hole 32a, the mounting holes 32b, and the positioning hole 33 are holes for mounting the non-transparent plate 30 to a rotor 38 mounted to the drive shaft 37 in a predetermined positional relationship. They are formed around the center hole 31. The rotor 38 is provided with protrusions (not shown) formed into shapes in correspondence with the shapes of the mounting-and-positioning hole 32a and the positioning hole 33. These holes 32a and 33 receive their respective protrusions to thereby mount the non-transparent disk 30 to the rotor 38 in a predetermined orientation and positional relationship. This causes the non-transparent disk 30 to be secured to the rotor 38 by screws which are passed through the mounting holes 32b. In this case, the non-transparent disk 30 and the rotor 38 can be directly secured together with screws, or can be indirectly secured together by interposing of the non-transparent disk 30 between the damper (not shown) and the disk 30, with the damper having screw through holes at locations in correspondence with the holes of the disk 30.

The Z phase signal detection signal is a through hole used for detecting the reference position of the drive shaft 37 and the number of rotations from the reference position, and is formed at a constant radius ($R_1$ in the embodiment) from the rotational center O of the non-transparent disk 30.

The light-transmitting holes 35 and the light-transmitting grooves 36 are apertures used for detecting the angle of rotation, direction of rotation, and the rotational speed of the drive shaft 37, and are formed with the same width w and at a constant pitch p at the outermost periphery of the non-transparent disk 30, as shown in FIG. 7. The light-transmitting holes 35, being slots, are formed radially and slightly inward from the outer peripheral edge of the non-transparent plate 30. On the other hand, the light-transmitting grooves 36 are long grooves cut out so as to extend inwardly from the outer peripheral edge of the non-transparent disk 30, and are formed radially between adjacent light-transmitting holes 35. The inner edges of each of the light-transmitting holes 35 and the light-transmitting grooves 36 are formed at a constant radius ($R_2$, where $R_1 < R_2$) measured from the rotational center O of the non-transparent disk 30, so that setting a photointerrupter 39 at the center of the light-transmitting holes 35, or at a radius $R_3$ from the rotational center O of the transparent disk 30, allows the signals from the light-transmitting holes 35 and those from the light-transmitting grooves 36 to be detected at the same level.

A description will now be given of the method of producing the code plate of the present embodiment.

A non-transparent plastic plate, metallic plate, or the like is punched to produce the non-transparent disk 30 provided with the center hole 31, the mounting-and-positioning hole 32, the mounting holes 32b, the positioning hole 33, and the Z phase signal detection hole 34.

The non-transparent disk is interposed between the punch and the dice. The punch is provided with a predetermined number of light-transmitting hole opening pins and a light-transmitting groove forming cutter. The light-transmitting hole opening pins are moved into and beyond the dice to form the light-transmitting holes 35. In this case, the portion where the light-transmitting grooves 36 are to be formed and the portion therearound, which are indicated by slanted lines in FIG. 8B, can be held between the punch and the dice, so that during formation of the light-transmitting holes 35, the non-transparent disk is held more securely, resulting in more accurate formation of the light-transmitting holes 35.

The light-transmitting groove forming cutter is then driven to form the light-transmitting grooves 36 in the outer periphery of the non-transparent disk 30 with the light-transmitting holes 35. In this case, the portion around the light-transmitting holes 35, indicated by slanted lines in FIG. 8C, can be held between the punch and the dice, so that in this case too during formation of the light-transmitting grooves 36, the non-transparent plate 30 can be held more securely. In addition, since the force required to cut out the light-transmitting grooves is considerably less than the force required to punch out the light-transmitting holes, the light-transmitting grooves 36 can be formed more accurately in a narrow space, after the light-transmitting holes have been punched out.

According to the method of producing the code plate of the present embodiment, the light-transmitting holes 35 and the light-transmitting grooves 36 can be formed more accurately, since the non-transparent disk 30 can be held more securely by the dice and the punch. In addition, it is possible to reduce die production costs and thus rotary encoder production costs, since the number of expensive light-transmitting hole opening pins can be reduced by an amount corresponding to the number of light-transmitting grooves 36.

Embodiment 4

Figure 9:
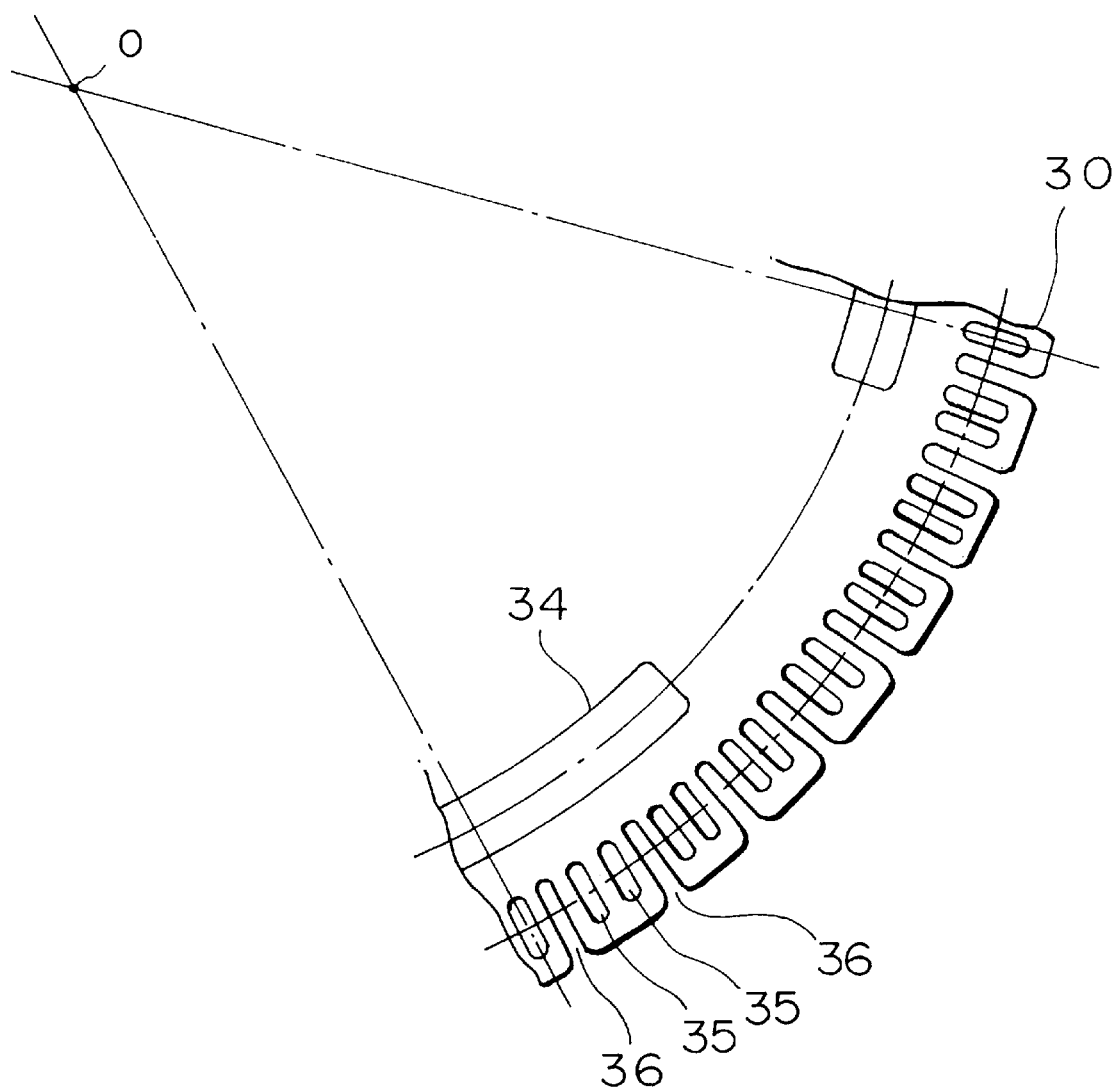
FIG. 9 is a plan view showing the main portion of a code plate of embodiment 4 in accordance with the present invention.

Although in Embodiment 3, one light-transmitting hole 30 was formed for every light-transmitting groove 36 in the outer periphery of the non-transparent disk 30, the gist of the present invention is not limited thereto, so that as in Embodiment 4 illustrated in FIG. 9 a plurality of light-transmitting holes 35 can be formed for every light-transmitting groove 36. Although in the embodiment of FIG. 9, two light-transmitting holes 35 are formed for every light-transmitting groove 36, it is obvious that three or more light-transmitting holes 35 can be formed for every light-transmitting groove 36.

Embodiment 5

Figure 10:
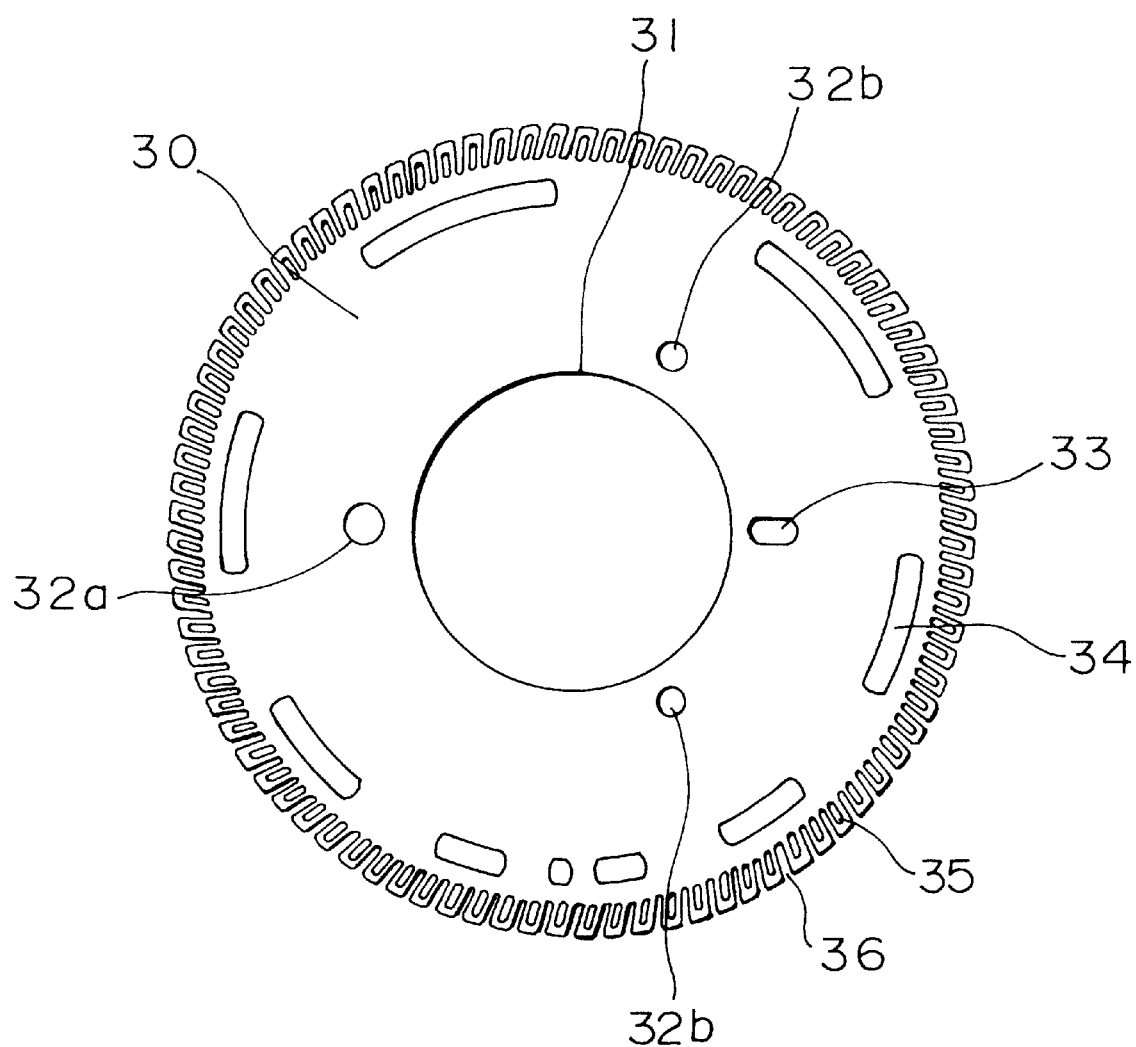
FIG. 10 is a plan view showing the main portion of a code plate of Embodiment 5 in accordance with the present invention.
Figure 11:
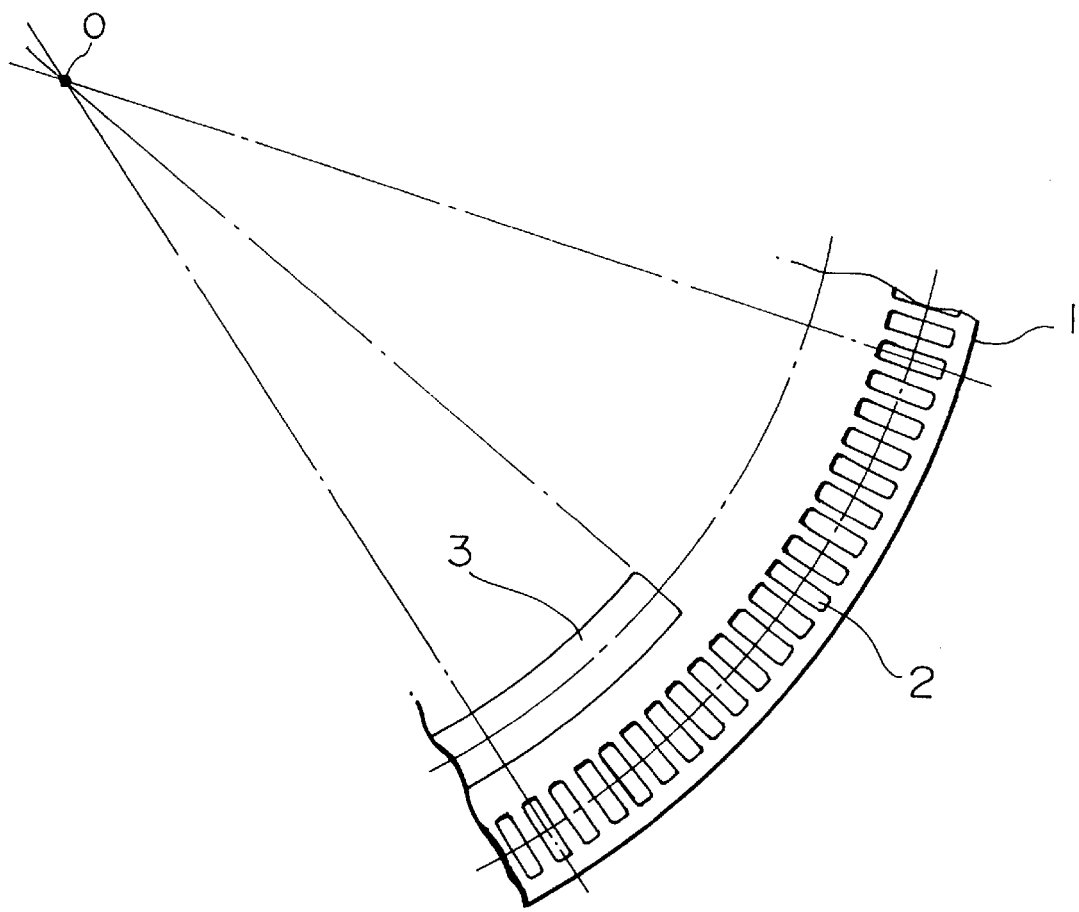
FIG. 11 is a front view of the main portion of a conventional plate.
Figure 12:
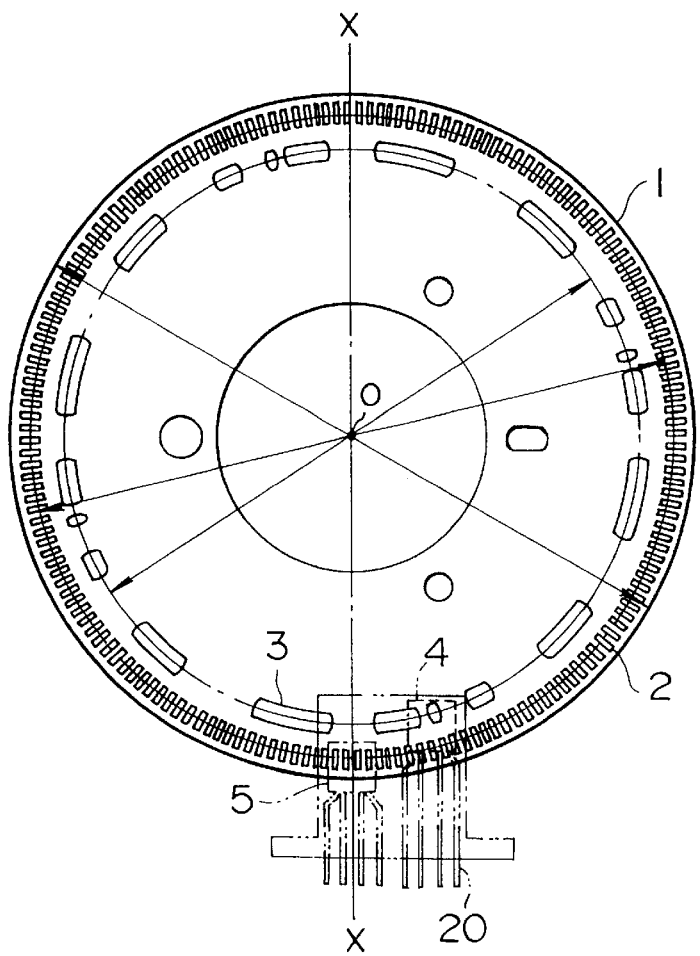
FIG. 12 is a front view of the mounting position of the photointerrupter(s) of the conventional code plate.

Although in Embodiment 3, the light-transmitting holes 35 and the light-transmitting grooves 36 were formed radially, the gist of the present invention is not limited thereto, so that as in Embodiment 5 shown in FIG. 10, the light-transmitting holes 35 and the light-transmitting grooves 36 can be tilted at a constant angle from the radial line X—X extending from the rotational center O of the non-transparent plate 30.

Although in Embodiment 3, the light-transmitting grooves 36 were formed after the light-transmitting holes 35, the grooves 36 may be formed before the light-transmitting holes 35.

Although in Embodiment 3, the center hole 31, the mounting-and-positioning hole 32, the mounting holes 32b, the positioning hole 33, the Z phase signal detection hole 34 were formed in the non-transparent disk plate, in addition to the light-transmitting holes 35 and the light-transmitting grooves 36, not all of these holes need to be formed, so that only those required may be formed, as required. In addition, the arrangement of the holes 31 to 34 is not limited to that of Embodiment 3, so that they may be appropriately arranged, as required.

As can be understood from the foregoing description, according to the present invention, a line extending in the longitudinal direction or an edge side of the light detection pattern is tilted radially in a constant direction and at a constant angle from the rotational center of the rotary substrate. Therefore, when the light-emitting device and the light-receiving device forming the photointerrupter are set in an offset fashion leftward or rightward from a vertical line extending vertically from a printed board having mounted thereon the photointerrupter and passing through the rotational center of the rotary substrate, an A phase signal and a B phase signal which are in phase are obtained, a Z phase signal converted into a two-phase signal is obtained, the origin of the rotary substrate can be accurately detected, and the rotation of the rotary member can be precisely controlled.

In addition, since the component parts of the photointerrupter can be set in an offset fashion on the left or right of the vertical line passing through the rotational center O of the rotary substrate, it becomes easier to dispose the photointerrupter, thus making it possible to place less restrictions on the design of this type of optical rotary encoder.

Further, a general-purpose light-receiving device can be used for the light-receiving device of the photointerrupter, which makes it possible to reduce costs.

According to the present invention, in order to form light-transmitting apertures in the code plate, a plurality of light-transmitting grooves recessed inward from the outer peripheral edge of the non-transparent disk are formed, and one or more light-transmitting holes are formed between the light-transmitting grooves. Accordingly, when the light-transmitting apertures are produced so that either the light-transmitting holes or the light-transmitting grooves are formed first, followed by formation of either the light-transmitting holes or the light-transmitting grooves which have not been formed yet, the light-transmitting holes and the light-transmitting grooves can be formed accurately. Therefore, it is possible to produce a more reliable light-transmission type rotary encoder with a high resolution and having light-transmitting apertures disposed at a narrow pitch, as a result of which various control operations with high responsivity can be achieved using the rotary encoder. Forming a plurality of light-transmitting grooves and light-transmitting holes, as light-transmitting apertures to be formed in the code plate, can reduce the number of expensive light-transmitting hole opening pins in correspondence with the number of light-transmitting grooves and can simplify the die construction to thereby reduce die production costs. In addition, maintenance costs for repairing broken light-transmitting hole opening pins can be reduced, resulting in reduced overall production costs of the light-transmission type rotary encoder.

What is claimed is:

1. A code plate of an optical rotary encoder, said code plate comprising:

a rotary substrate having a center of rotation, and a plurality of rectangular or elliptical light-detection patterns formed at a constant radius from the center of rotation and in the circumferential direction of said rotary substrate, wherein an axial line in the longitudinal direction of each of said plurality of light-detection patterns is tilted in a constant direction and at a constant angle with respect to a straight line connecting the center of rotation of said rotary substrate and the center of said light-detection pattern, and the angle is equal to an angle created between a vertical line passing through the center of rotation of said rotary substrate and a straight line connecting said center of rotation of said rotary substrate and an optical axis of a photointerrupter which extends substantially perpendicular to said rotary substrate.

2. A code plate of an optical rotary encoder, said code plate comprising:

a rotary substrate having a center of rotation; and an arcuate light-detection pattern formed around a center defined by the center of rotation of said rotary substrate, in the circumferential direction of said rotary substrate, and at a constant radius from the center of rotation, wherein a leading edge side and a trailing edge side of said light-detection pattern are tilted in a constant direction and at a constant angle with respect to a straight line connecting the center of rotation of said rotary substrate and the center between said edge sides, and the angle is equal to an angle created between a vertical line passing through the center of rotation of said rotary substrate and a straight line connecting said center of rotation of said rotary substrate and an optical axis of a photointerrupter which extends substantially perpendicular to said rotary substrate.

3. A code plate of an optical rotary encoder, said code plate comprising:

a rotary substrate having a center of rotation; and a group of rectangular or elliptical light-detection patterns and an arcuate light-detection pattern, which are formed at different radii from the center of rotation on said rotary substrate, wherein of the two types of light-detection patterns, an axial line in the longitudinal direction or an edge side of the pattern type formed closer to the outer periphery of said rotary substrate is tilted in a constant direction and at a constant angle with respect to a straight line connecting the center of rotation of said rotary substrate and the center of said rectangular or elliptical light-detection pattern, or with respect to a straight line connecting the center of rotation of said rotary substrate and the center between the edge sides of said arcuate light-detection pattern, and the angle is equal to an angle created between a vertical line passing through the center of rotation of said rotary substrate and a straight line connecting said center of rotation of said rotary substrate and an optical axis of a photointerrupter which extends substantially perpendicular to said rotary substrate.

4. A code plate of a light-transmission type rotary encoder, said code plate comprising:

a non-transparent disk; and light-transmitting apertures formed with a same width and at a same radius from the center of rotation of said non-transparent disk, wherein said light-transmitting apertures are in the form of a plurality of light-transmitting grooves and one or more light-transmitting holes, said light-transmitting grooves being cut out so as to be recessed inward from the outer peripheral edge of said non-transparent disk, and said one or more light-transmitting holes being formed between adjacent light-transmitting grooves.

5. A code plate of an optical rotary encoder, said code plate comprising:

a rotary substrate having a center of rotation; and a group of rectangular or elliptical light-detection patterns and an arcuate light-detection pattern, which are formed at different radii from the center of rotation on said rotary substrate, wherein of the two types of light-detection patterns, an axial line in the longitudinal direction or an edge side of the pattern type formed closer to the outer periphery of said rotary substrate is tilted in a constant direction and at a constant angle with respect to a straight line connecting the center of rotation of said rotary substrate and the center between said edge sides, and the angle is and the angle is equal to an angle created between a first vertical line passing through the center of rotation of said rotary substrate and a straight line connecting said center of rotation of said rotary substrate and an optical axis of a first photointerrupter which extends substantially perpendicular to said rotary substrate;

wherein said first photointerrupter is of the type used to detect the light-detection pattern formed at said outer periphery and an optical axis of a second photointerrupter for use in detecting another light-detection pattern is located on a second vertical line passing through the optical axis of the first photointerrupter.

* * * * *

UNITED STATES PATENT AND TRADEMARK OFFICE
CERTIFICATE OF CORRECTION

PATENT NO. :       5,949,067
DATED       :       September 7, 1999
INVENTOR(S) :     Tadashi Sano It is certified that error appears in the above-identified patent and that said Letters Patent is hereby corrected as shown below:

On the Title Page

In column 2, line 19, under "ABSTRACT", after "set" insert --at--.

In the Claims

In claim 5, line 15, delete "and the angle is".

Signed and Sealed this

Sixth Day of June, 2000

Attest:

Q. TODD DICKINSON

Attesting Officer

Director of Patents and Trademarks